US010562145B2

(12) United States Patent
Yada

(10) Patent No.: US 10,562,145 B2
(45) Date of Patent: Feb. 18, 2020

(54) METHOD AND DEVICE FOR MANAGING REPLACEMENT TIME FOR CONSUMABLE PART OF MACHINE TOOL

(71) Applicant: MAKINO MILLING MACHINE CO., LTD., Tokyo (JP)

(72) Inventor: Kenichi Yada, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 316 days.

(21) Appl. No.: 15/578,014

(22) PCT Filed: May 29, 2015

(86) PCT No.: PCT/JP2015/065648
§ 371 (c)(1),
(2) Date: Nov. 29, 2017

(87) PCT Pub. No.: WO2016/194070
PCT Pub. Date: Dec. 8, 2016

(65) Prior Publication Data
US 2018/0290255 A1    Oct. 11, 2018

(51) Int. Cl.
| | |
|---|---|
| *B23Q 17/09* | (2006.01) |
| *B23K 26/146* | (2014.01) |
| *B23K 26/70* | (2014.01) |
| *C02F 9/00* | (2006.01) |
| *B23K 26/38* | (2014.01) |

(Continued)

(52) U.S. Cl.
CPC ........ *B23Q 17/0952* (2013.01); *B23K 26/146* (2015.10); *B23K 26/38* (2013.01); *B23K 26/702* (2015.10); *B23Q 17/09* (2013.01); *B23Q 17/0995* (2013.01); *C02F 9/00* (2013.01); *C02F 1/283* (2013.01); *C02F 1/32* (2013.01); *C02F 1/42* (2013.01); *C02F 1/441* (2013.01); *C02F 2103/04* (2013.01)

(58) Field of Classification Search
CPC ................ B23Q 17/0952; B23Q 17/09; B23Q 17/0904; B23Q 17/0995; B23K 26/146; B23K 26/702; B23K 26/38; C02F 9/00; C02F 1/283; C02F 1/32; C02F 1/42; C02F 1/441; C02F 2103/04
USPC .................................................... 219/121.84
See application file for complete search history.

(56) References Cited

U.S. PATENT DOCUMENTS

| | | | |
|---|---|---|---|
| 2004/0104203 A1* | 6/2004 | Yamaguchi | ............ B23K 26/38 219/121.36 |
| 2008/0185367 A1 | 8/2008 | El-Hanany et al. | |
| 2012/0298649 A1 | 11/2012 | Nagata et al. | |

FOREIGN PATENT DOCUMENTS

| | | |
|---|---|---|
| CN | 203596034 | 5/2014 |
| JP | 5-389 | 1/1993 |

(Continued)

OTHER PUBLICATIONS

International Search Report dated Aug. 25, 2015, directed to PCT Application No. PCT/JP2015/065648; 2 pages.

*Primary Examiner* — Tuan N Nguyen
(74) *Attorney, Agent, or Firm* — Morrison & Foerster LLP

(57) ABSTRACT

In order to monitor replacement time for a consumable part of a machine tool, the present invention defines a time period after the power of the machine tool is turned off until the next turn-on thereof as a pause time for the consumable part, and provides a notification that the replacement time for the consumable part has come when the pause time is not less than a predetermined threshold.

6 Claims, 4 Drawing Sheets

(51) Int. Cl.
     *C02F 1/44*         (2006.01)
     *C02F 1/32*         (2006.01)
     *C02F 103/04*     (2006.01)
     *C02F 1/42*         (2006.01)
     *C02F 1/28*         (2006.01)

(56) References Cited

FOREIGN PATENT DOCUMENTS

| JP | 2001-176535 | 6/2001 |
|---|---|---|
| JP | 2003-62560 | 3/2003 |
| JP | 2003-117545 | 4/2003 |
| JP | 2007-125493 | 5/2007 |
| JP | 2009-233570 | 10/2009 |

\* cited by examiner

METHOD AND DEVICE FOR MANAGING REPLACEMENT TIME FOR CONSUMABLE PART OF MACHINE TOOL

CROSS-REFERENCE TO RELATED APPLICATION

This application is a U.S. national phase patent application of International Patent Application No. PCT/JP2015/065648, filed May 29, 2015, of which is hereby incorporated by reference in the present disclosure in its entirety.

FIELD OF THE INVENTION

The present invention relates to a method and device for managing the replacement time for a consumable part of a machine tool that monitors the replacement time of consumable parts that are consumed or deteriorated when the machine is not in use.

BACKGROUND OF THE INVENTION

Patent Literature 1 describes a managing system for a laser processing machine which performs processing on a workpiece by relatively moving a laser processing head and a workpiece, and which collects data on the operating status of the laser processing machine, including the power-on time of an NC device that numerically controls the laser processing machine, the operation status of the laser oscillator, and the amount of time of relative movement between the laser processing head and the workpiece, and which notifies of the arrival of maintenance and inspection time for the maintenance items of each component of the laser processing machine.

PATENT PUBLICATIONS

Patent Literature 1: JP-A-H05-000389

BRIEF SUMMARY OF THE INVENTION

In the laser processing system of Patent Document 1, it is possible to notify the arrival of maintenance and inspection time by item, but it is impossible to monitor the deterioration of consumable parts during the period in which the laser processing machine is powered off and the machine is stopped for a certain period of time. In recent laser processing machines, high-pressure ultrapure water is jetted from a nozzle toward a workpiece so as to form a water column, and laser light is irradiated onto the workpiece through the water column. In such a laser processing machine, if the ultrapure water supply device is stopped for a certain period or longer, bacteria and germs can propagate in parts constituting the ultrapure water supply device, such as, for example, pre-filters for filtering raw water, such as tap water, activated carbon filters, reverse osmosis membranes, and ion exchange resins, causing deterioration and necessitating the replacement of these consumable parts.

The technical task of the present invention is to solve such problems of the prior art, and it is an object of the present invention to provide a method and device for managing the replacement time for consumable parts of a machine tool, wherein the method and device are capable of monitoring the replacement time of parts (consumable parts) that are consumed or deteriorated when the machine tool is not in use.

In order to solve the above problem, according to the present invention, a replacement time managing method for monitoring the replacement time of a consumable part of a machine tool, comprising obtaining a time period from when a power supply of the machine tool is turned off until the next time the power supply is turned on as a downtime of the consumable part, and notifying, when the downtime is equal to or greater than a predetermined threshold value, that the consumable part has reached a replacement time is provided.

According to another embodiment of the present invention, a consumable part replacement time managing device for monitoring replacement time of a consumable part of a machine tool, including an OFF date and time storage unit configured to store a date and time when a power supply of the machine tool is turned off as an OFF date and time, an ON date and time storage unit configured to store a date and time when the power supply of the machine tool is turned on after the power supply of the machine tool is turned off as an ON date, and a consumable part replacement time managing unit configured to obtain, based on the OFF date and time and the ON date and time, a time period from when the power supply of the machine tool is turned off until the next time the power supply is turned on as a downtime of the consumable part, and notifying, when the downtime is equal to or greater than a predetermined threshold value, that the consumable part has reached a replacement time is provided.

According to the present invention, it is possible to monitor the replacement time of parts that are consumed or deteriorated when the power supply of the machine tool is turned off.

BRIEF DESCRIPTION OF THE DRAWINGS

FIG. 1 shows an optical head of a laser processing machine as an example of a machine tool to which the present invention is applicable. In FIG. 1, an optical head 10 includes a laser irradiation head 16 which is arranged in a housing 12, receives laser light from a laser oscillator 14 via a light guide member 14a, such as an optical fiber, and which irradiates the light onto a collimation lens 18. The laser light from the laser irradiation head 16 is collimated by the collimation lens 18, and is reflected by a first mirror 20 toward a second mirror 22, and is reflected by the second mirror 22 toward a focus lens 24. The laser light focused by the focus lens 24 is irradiated to the outside of the housing 12 through the nozzle head 26. Here, the optical axis of the laser beam irradiated by the optical head 10 is substantially parallel to the Z-axis.

Figure 1:
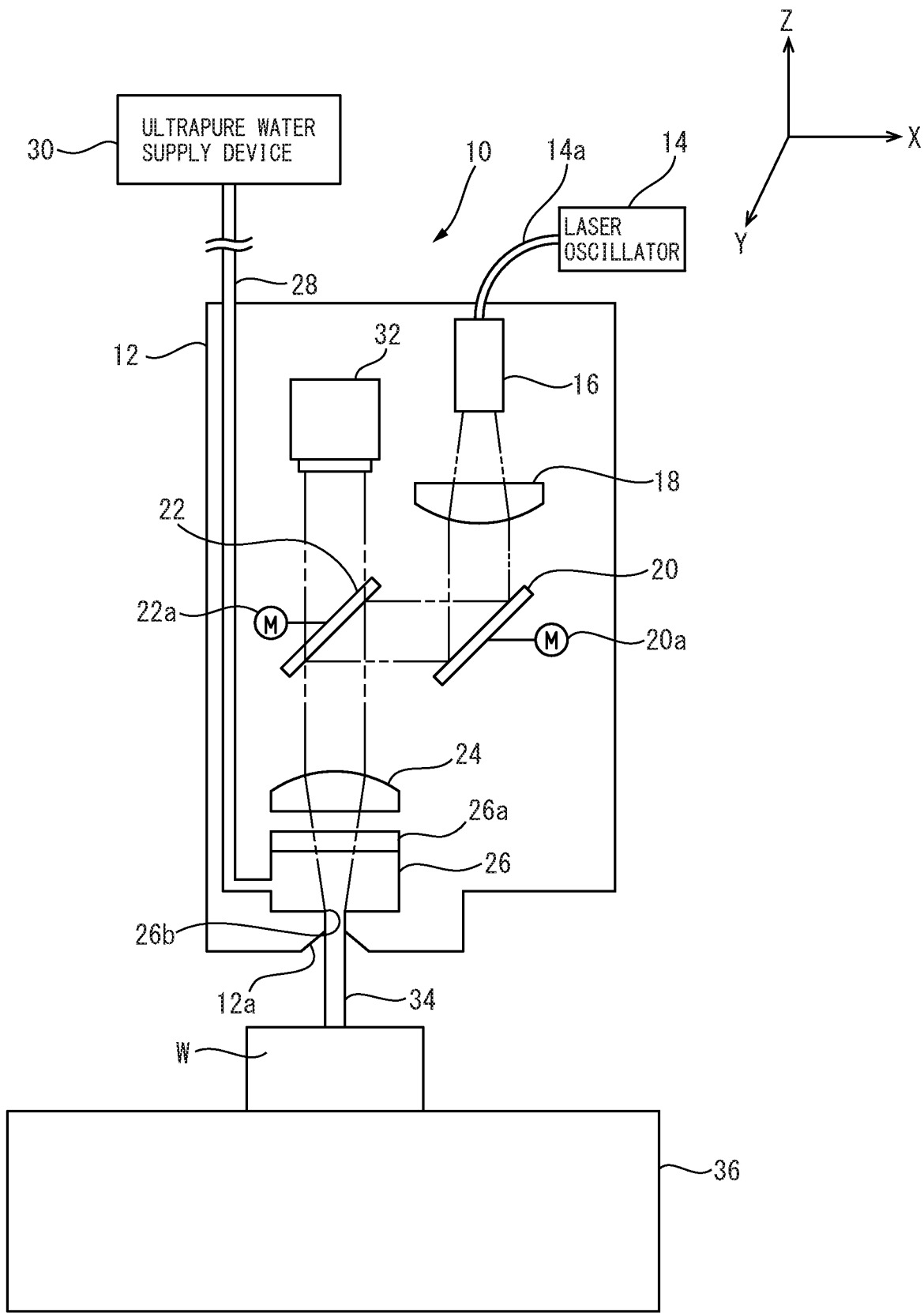
FIG. 1 is a schematic cross-sectional view of an optical head of a laser processing machine as an example of a machine tool to which the present invention is applied.

The first and second mirrors 20, 22 have planar reflecting surfaces, and have motors 20a, 22a as mirror orientation adjusting means for adjusting the directions of the reflecting surfaces (the directions perpendicular to the reflecting surfaces) and adjusting the direction of the laser beam irradiated from the optical head 10. Furthermore, the first and second mirrors 20, 22, in particular the second mirror 22 which reflects the laser light toward the focus lens 24, include a dielectric multilayer film which is adapted to the wavelength of the laser light emitted from the laser oscillator 14, reflects the laser light of the adaptable wavelength, and allows light of wavelengths other than the adaptable wavelength to be transmitted therethrough. More specifically, such dielectric multilayer film is formed by vapor deposition on a glass plate. By forming the second mirror 22 from the dielectric multilayer film, it is possible to monitor the positional relationship between the laser beam irradiated from the nozzle 26b and the nozzle 26b using the camera 32.

The nozzle head 26 is a hollow member that receives a supply of ultrapure water from an ultrapure water supply device 30 via a line 28. A nozzle 26b for ejecting a water jet is provided on the bottom wall of the nozzle head 26 facing the table 36, and a window 26a, which is made of a transparent member such as glass, is provided on the upper surface of the nozzle facing the focus lens 24 on the opposite side of the bottom wall. The nozzle 26b is communicable with the outside of the housing 12 through an orifice 12a formed in the bottom surface of the housing 12 of the optical head 10.

Figure 2:
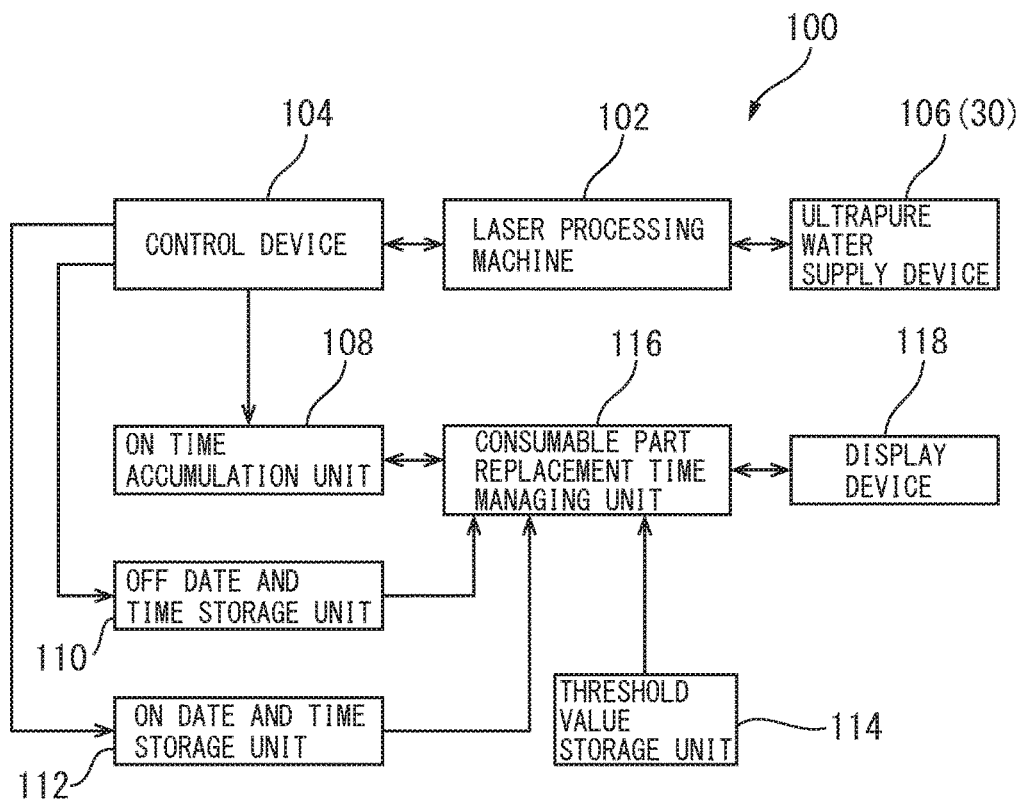
FIG. 2 is a block diagram showing a consumable part replacement time managing device according to a preferred embodiment of the present invention.

With reference to FIG. 2, the consumable part replacement time managing device 100 of the present invention includes, as main constituent elements, a consumable part replacement time managing unit 116, an ON time accumulation unit 108, an OFF date and time storage unit 110, and ON date and time storage unit 112, a threshold value storage unit 114, and a display unit 118. The ON time accumulation unit 108, the OFF date and time storage unit 110, and the ON date and time storage unit 112 receive the time from the timer (not shown) of a control device 104 of a laser processing machine 102. The display unit 118 can be formed by, for example, a liquid 5 crystal panel (not shown) provided in the control panel (not shown) of the laser processing machine 102 or the like.

Figure 3:
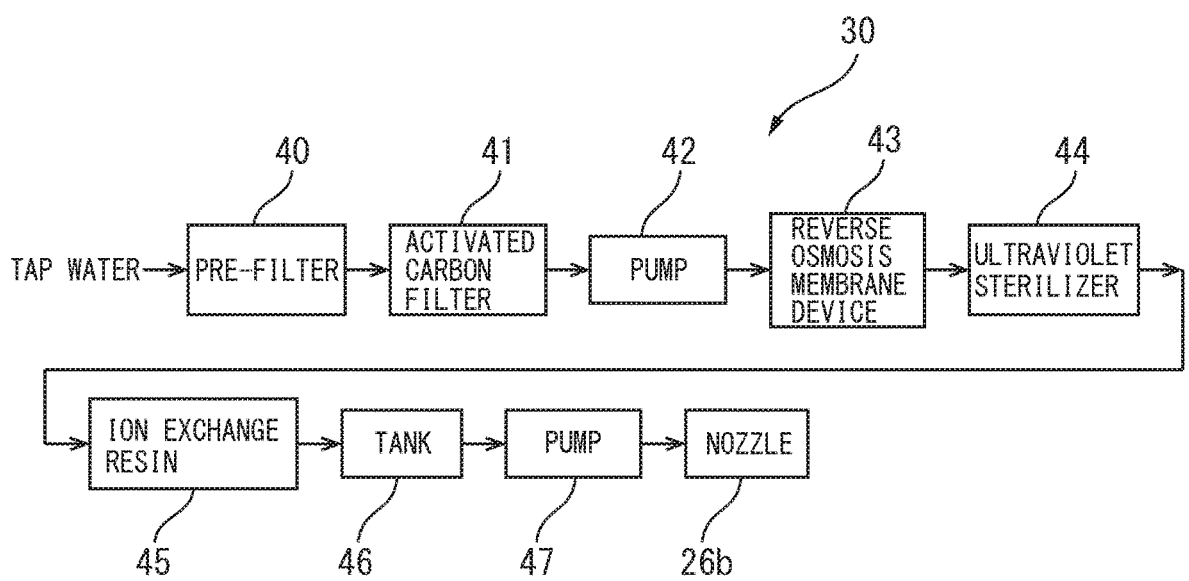
FIG. 3 is a block diagram of an ultrapure water supply device for supplying ultrapure water to an optical head of a laser processing machine.

With reference to FIG. 3, in an ultrapure water supply device 30, which is shown as an example, city water or tap water is filtered in advance by a pre-filter 40 and an activated carbon filter 41, is pressurized by a pump 42, is supplied to a reverse osmosis membrane device 43, and is highly filtered by the reverse osmosis membrane device 43. Next, after passing through an ultraviolet sterilizer 44, further impurities are removed by an ion exchange resin 45 to produce ultrapure water. The ultrapure water thus produced is stored in a tank 46, and then supplied by a pump 47 to a nozzle 26b of the optical head 10 via a line 28.

Figure 4:
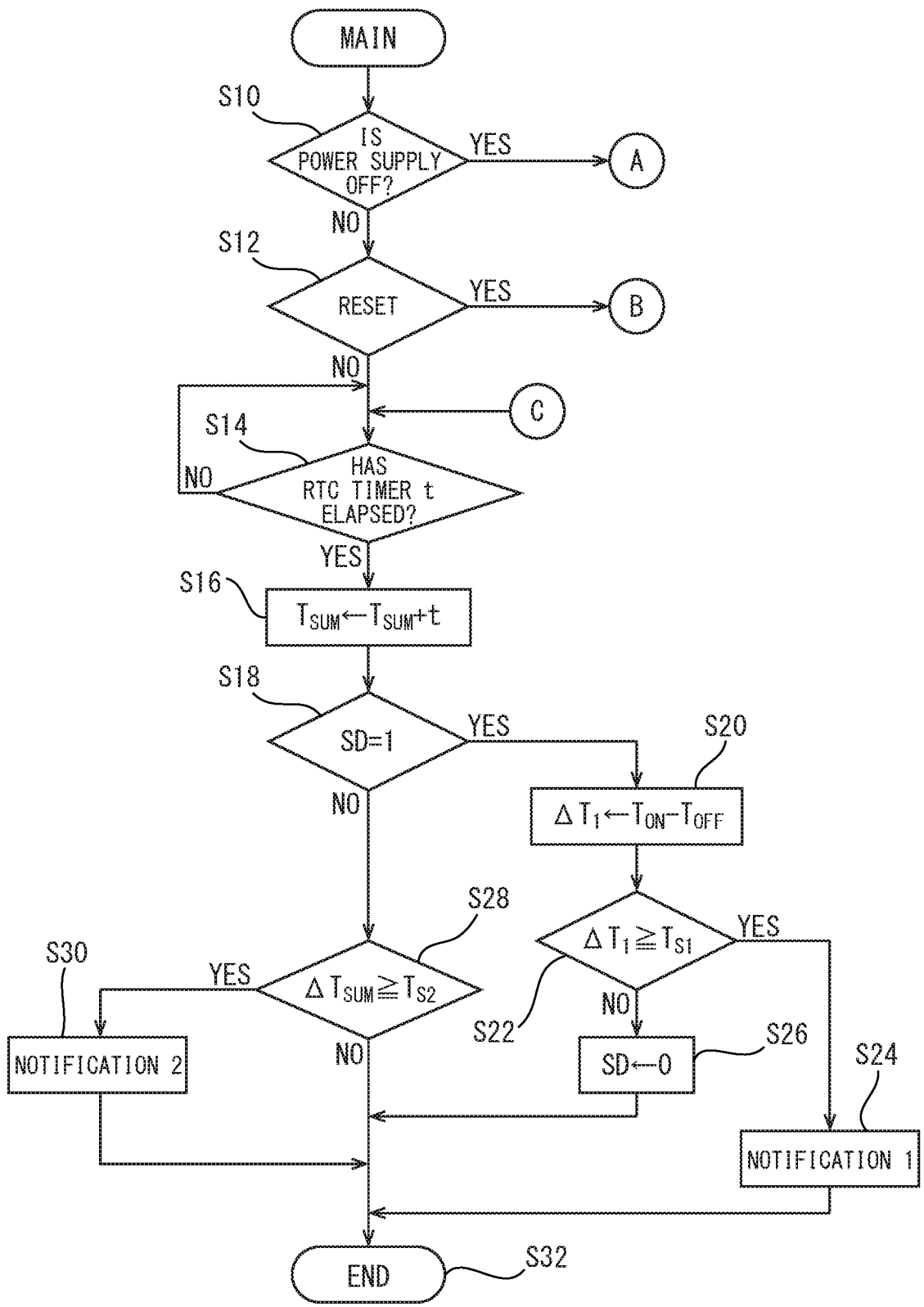
FIG. 4 is a flowchart showing the main routine of the consumable part replacement time managing method according to an embodiment of the present invention.
Figure 5:
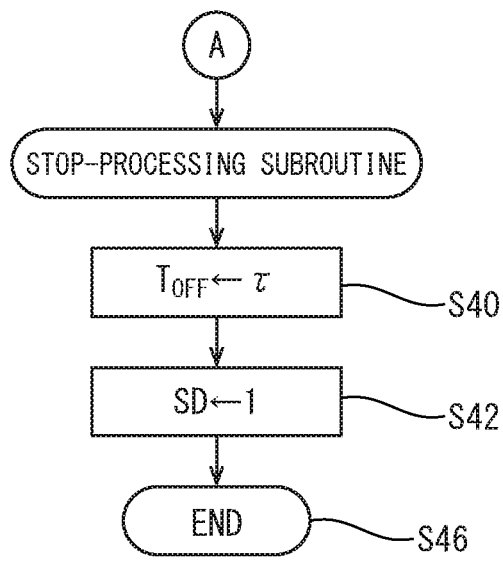
FIG. 5 is a flowchart showing a stop-processing subroutine of the consumable part replacement time managing method according to an embodiment of the present invention.

The operation of the consumable part replacement time managing device 100 according to the present embodiment will be explained below with reference to FIGS. 4 to 6. FIG. 4 is a flowchart showing the main routine of the consumable part replacement time managing device 100. When the main routine is executed, it is determined whether or not the power supply of the laser processing machine 102 is off (step S10). When the power supply of the laser processing machine 102 is off ("Yes" in step S10), the stop-processing subroutine shown in FIG. 5 is called. The main routine can be interrupted by the stop-processing subroutine using the power-off of the laser processing machine 102 as a trigger.

When the stop-processing subroutine is started, the OFF date and time storage unit 110 reads the current time (date and time) τ from the control device 104 of the laser processing machine 102 as the OFF date and time $T_{OFF}$ (step S40). The OFF date and time storage unit 110 can be constituted by a storage region capable of storing information even after the power supply of the laser processing machine 102 is turned off. Next, 1 is input to the flag SD indicating that the power supply of the laser processing machine is turned off (step S42), and the stop-processing subroutine ends (step S46). Note that an emergency power supply is provided in the control device 104 of the laser processing machine 102 which has a battery, a capacitor or the like so that the stop-processing subroutine can be executed when the power supply of the laser processing machine 102 is turned off.

When the power supply of the laser processing machine 102 is turned off, the main routine is forcibly terminated. Thereafter, when the power supply of the laser processing machine 102 is turned on, the main routine begins from step S10 with the flag SD=1, indicating that the laser processing machine 102 has been turned off and with the OFF date and time ($T_{OFF}$=τ).

When step S10 is "No", that is, when the power supply of the laser processing machine 102 has not been turned off, i.e., the interruption of the power-off has not been triggered, it is determined in step S12 whether or not the consumable parts have been replaced. This determination can be made by setting a flag indicating that the consumable parts have been replaced when an operator presses a reset button provided in, for example, the laser processing machine 102, the control device 104 thereof, or the ultrapure water supply device 106 (30) whenever a consumable part is replaced.

Figure 6:
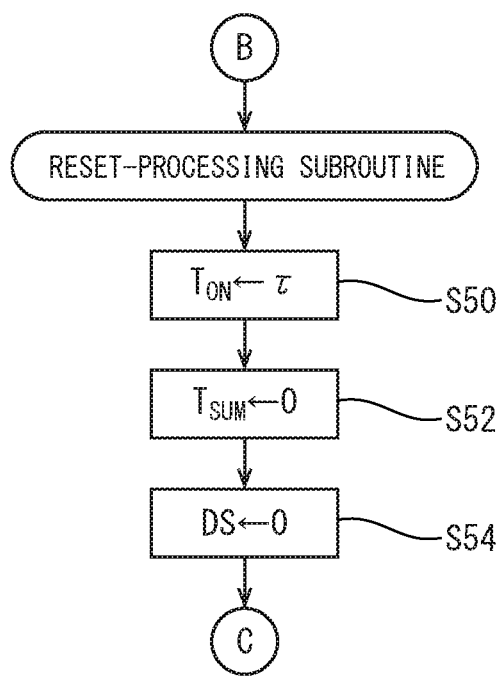
FIG. 6 is a flowchart showing a reset-processing subroutine of a consumable part replacement timing managing method according to an embodiment of the present invention.

When step S12 is "Yes", that is, when the consumable parts have been replaced, the reset-processing subroutine shown in FIG. 6 is called. When the reset-processing subroutine is called, the ON date and time storage unit 112 reads the current time (date and time) τ from the control device 104 of the laser processing machine 102 as the ON date and time $T_{ON}$ (step S50). The ON date and time storage unit 112 can be constituted by a storage region capable of retaining information even after the power supply of the laser processing machine 102 is turned off. In this case, the ON date and time $T_{ON}$ is the time at which the power supply of the laser processing machine 102 is turned on after the power supply of the laser processing machine 102 has been turned off. Next, the accumulated value $T_{SUM}$ of the ON time, which is the accumulated value of the time during which the laser processing machine 102 is turned on, is reset to 0 (step S52), and the flag SD indicating that the power supply of the laser processing machine 102 has been turned off is reset to 0 (Step S54).

When step 12 is "No", that is, when consumable parts have not been replaced, the process proceeds to step S14 without executing the above reset-processing. In step S14, an appropriate timer (not shown), such as, for example, an RTC (real-time clock) timer of control device 104 of the laser processing machine 102, is used to allow a predetermined time t to elapse. The predetermined time t can be, for example, one minute. After the predetermined time t has elapsed in step S14, the predetermined time t is added to the accumulated value $T_{SUM}$ of the ON time, and the ON time accumulation unit 108 accumulates the time during which the laser processing machine 102 has been turned ON after the replacement of the consumable parts (step S16). The ON time accumulation unit 108 can be constituted by a storage region capable of retaining information even after the power supply of the laser processing machine 102 is turned off.

Next, it is determined from the value of the flag SD whether or not the power of the laser processing machine 102 has been turned off (step S18). When SD=1 ("Yes" in step S18), that is, when the laser processing machine 102 has been turned off, the consumable parts replacement time managing unit 116 reads the OFF date and time $T_{OFF}$ from the off date and time storage unit 110 and subtracts the OFF date and TIME $T_{OFF}$ from the ON date and time $T_{ON}$ to thereby calculate a downtime $\Delta T_1$, which is the time during which the laser processing machine 102 was turned of (step S20).

Next, the consumable part replacement time managing unit 116 reads the first threshold value $TS_1$ from the threshold value storage unit 114 and compares the downtime $\Delta T_1$ with the first threshold value $TS_1$ (step S22). When $\Delta T_1 \geq TS_1$ ("Yes" in step S22), that is, when the downtime during which the laser processing machine 102 was stopped is equal to or greater than the first threshold value, the consumable part replacement time managing unit 116 notifies or warns that the downtime of the laser processing machine 102 is longer than the predetermined time indicated by the first threshold value $TS_1$ (step S24). This notification or warning may be, for example, acoustically performed by a buzzer or the like provided in the laser processing machine 102, or may be visually performed on the display unit 118 by displaying an icon or text indicating that the downtime of the laser processing machine 102 is longer than the predetermined time. After notifying, the main routine ends (step S32).

The operator or maintenance person of the laser processing machine 102 replaces consumable parts based on the above notification or warning. The consumable parts to be replaced include the pre-filter 40, the activated carbon filter 41, the reverse osmosis membrane device 43, and the ion exchange resin 45. The replacement of the consumable parts can be performed by replacing all of the consumable parts of such a device. Alternately, a specific consumable part may be replaced based on the magnitude of the downtime $\Delta T_1$. To this end, it is possible to display the consumable parts to be exchanged on the display part 118 based on the magnitude of the downtime $\Delta T_1$.

When $\Delta T_1 < TS_1$ ("No" in step S22), that is, when the downtime of the laser processing machine 102 is lesser than the first threshold value, the flag SD indicating that the power supply of the laser processing machine 102 has been turned off is reset to 0 (step S26), and the main routine ends (step S32).

When the power source of the laser processing machine 102 is not turned off, at the time of replacement of the consumable parts, 0 is input to the flag SD in step S54 of the reset-processing subroutine, so that step S18 becomes "No". In such a case, the consumable parts replacement time managing unit 116 reads the accumulated value $T_{SUM}$ of the ON date and time obtained by accumulating the time during which the laser processing machine 102 is on from the ON time accumulation unit 108, and additionally, the second threshold value $TS_2$ is read from the threshold value storage unit 114, and $T_{SUM}$ is compared with $TS_2$ (step S28). When $T_{SUM} \geq TS_2$ ("Yes" in step S28), the consumable parts replacement time managing unit 116 notifies or warns that the accumulated time of use up to the present since the replacement of the consumable parts is equal to or greater than the predetermined time indicated by the second threshold value $TS_2$ (step S30). This notification or warning may be, for example, acoustically performed by a buzzer or the like provided in the laser processing machine 102, or, may be visually performed on the display unit 118 by displaying an icon or text indicating that the time of use since the replacement of the consumable parts is longer than the predetermined time. After notifying, the main routine ends (step S32).

The operator or maintenance person of the laser processing machine 102 replaces the consumable parts based on the above notification or warning and presses the reset button. The device whose consumable parts are to be replaced includes the pre-filter 40, the activated carbon filter 41, the reverse osmosis membrane device 43, and the ion exchange resin 45. The replacement of the consumable parts can be performed by replacing all of the consumable parts of such a device. Alternatively, a plurality of second threshold values $TS_2$ corresponding to the individual consumable parts may be set, and the accumulated time $T_{SUM}$ may be determined individually. When replacing specific consumable parts individually, it is possible to prepare a plurality of reset-processing subroutines corresponding to the individual consumable parts. Further, the above reset button may comprise a plurality of individual reset buttons for the various consumable parts.

The main routine described above is executed at predetermined intervals, for example, every minute.

In the embodiment described above, the pre-filter, the activated carbon filter, the reverse osmosis membrane device, and the ion exchange resin used in the ultrapure water supply device of the laser processing machine are exemplified as the consumable part, but the present invention is not limited thereto. The consumable part may include, for example, water-soluble cutting fluid (coolant) used in milling machines or lathes, grinding fluids used in grinding machines, electrical discharge machining fluid used in electrical discharge machines, guide surface lubricating liquids for lubricating the guide surfaces of machines tools, and the like.

When the power supply of the laser processing machine 102 is normally turned off, a predetermined stop subroutine is activated, and if the OFF date and time is stored in the OFF date and time storage unit 110 and the power source is subsequently turned on, an emergency power supply need not necessary be provided. Furthermore, when the power supply of the laser processing machine 102 is turned off, if a downtime accumulation timer connected to a power supply separate from the power supply of the laser processing machine 102 is activated, the OFF time can be obtained by counting the time until the power supply of the laser processing machine 102 is next turned on. However, an emergency power supply is effective considering the case of power failure and a case wherein the emergency stop button is pushed.

Furthermore, the OFF date and time storage unit 110 can be a non-volatile memory, and the current time can be regularly (for example, every minute) overwritten and stored while the power supply of the laser processing machine 102 is turned on. Even if the power supply of the laser processing machine 102 is turned off, the date and time just prior to turning off are kept and stored. When the power supply of the laser processing machine 102 is next turned on and the ON date and time is stored in the ON date and time storage unit 112, the difference from the OFF date and time in the OFF date and time storage unit 110 at that point can be obtained, to thereby obtain the OFF time. Doing so eliminates the need for an emergency power supply.

REFERENCE SIGNS LIST

10 Optical Head
14 Laser Oscillator
26 Nozzle Head
28 Line
30 Ultrapure Water Supply Device
36 Table
40 Pre-Filter
41 Activated Carbon Filter
43 Reverse Osmosis Membrane Device
45 Ion Exchange Resin
46 Tank
100 Consumable Part Replacement Time Managing Device
102 Laser Processing Machine
104 Control Device
106 Ultrapure Water Supply Device
108 ON Time Accumulation Unit
110 OFF Date and Time Storage Unit
112 ON Date and Time Storage Unit
114 Threshold Storage Unit
116 Replacement Time Managing Unit
118 Display Unit

The invention claimed is:

1. A replacement time managing method for monitoring replacement time of a consumable part of a machine tool, comprising:
    obtaining a time period from when a power supply of the machine tool is turned off until the next time the power supply is turned on as a downtime of the consumable part, and
    notifying, when the downtime is not smaller than a predetermined threshold value, that the consumable part has reached a replacement time.

2. The replacement time managing method for a consumable part of a machine tool according to claim 1, the method further comprising accumulating the time during which the power supply of the machine tool has been turned on after the consumable part has been replaced, and notifying, when an accumulated value of the time during which the power supply of the machine tool has been turned on is not smaller than a second threshold value, that the consumable part has reached a replacement time.

3. The replacement time managing method for a consumable part of a machine tool according to claim 1, wherein
    the machine tool is a laser processing machine having an ultrapure water supply device, and
    the consumable part includes at least one of a pre-filter, an activated carbon filter, a reverse osmosis membrane, and an ion exchange resin of the ultrapure water supply device.

4. A consumable part replacement time managing device for monitoring replacement time of a consumable part of a machine tool, comprising:
    an OFF date and time storage unit configured to store a date and time when a power supply of the machine tool is turned off as an OFF date and time,
    an ON date and time storage unit configured to store a date and time when the power supply of the machine tool is turned on after the power supply of the machine tool is turned off as an ON date and time, and
    a consumable part replacement time managing unit configured to obtain, based on the OFF date and time and the ON date and time, a time period from when the power supply of the machine tool is turned off until the next time the power supply is turned on as a downtime of the consumable part, and notifying, when the downtime is not less than a predetermined threshold value, that the consumable part has reached a replacement time.

5. The consumable part replacement time managing device according to claim 4, further comprising:
    an ON time accumulating part for accumulating the time during which the power supply of the machine tool has been turned on after the consumable part has been replaced, wherein
    when an accumulated value of the ON time is not less than a second threshold value, the consumable part replacement time managing unit notifies that the consumable part has reached a replacement time.

6. The consumable part replacement time managing device according to claim 4, wherein
    the machine tool is a laser processing machine having an ultrapure water supply device, and
    the consumable part includes at least one of a pre-filter, an activated carbon filter, a reverse osmosis membrane, and an ion exchange resin of the ultrapure water supply device.

* * * * *